Figure 1:
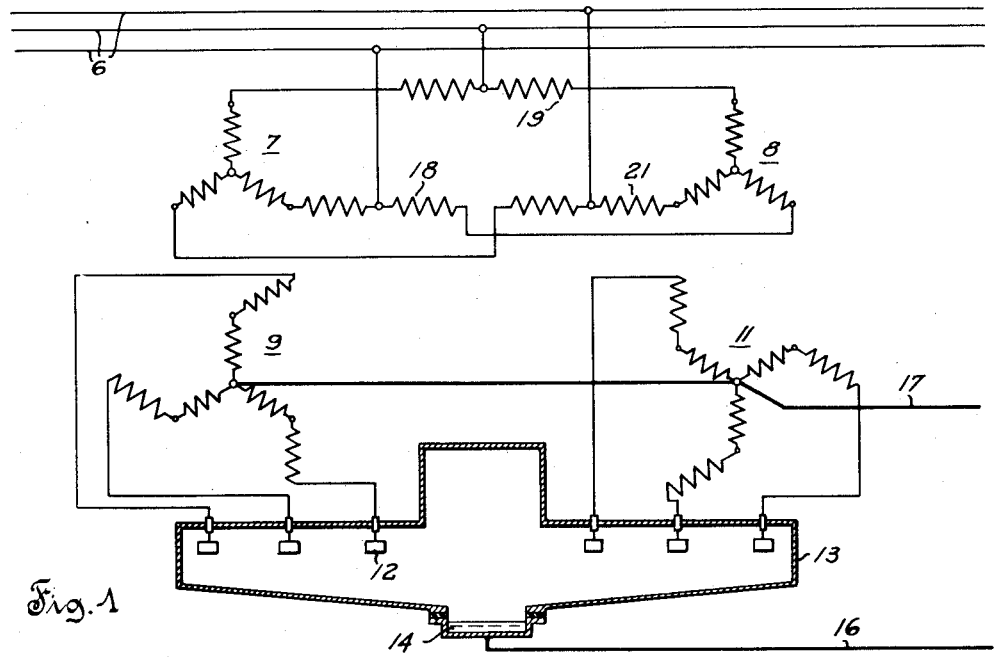

June 26, 1934.  J. KUBLER  1,964,521
RECTIFIER TRANSFORMER
Filed Nov. 11, 1932

Inventor
J. Kübler
by G. F. DeLine
Attorney

Patented June 26, 1934

1,964,521

UNITED STATES PATENT OFFICE 1,964,521

RECTIFIER TRANSFORMER

Johannes Kübler, Baden, Switzerland, assignor to Aktiengesellschaft Brown Boveri & Cie, Baden, Switzerland, a joint-stock company of Switzerland Application November 11, 1932, Serial No. 642,196
In Germany November 12, 1931

4 Claims. (Cl. 75—363)

This invention relates to improvements in electric current rectifying systems and more particularly to means for supplying a polyphase rectifier or a group of single phase rectifiers with currents of a number of phases greater than the number of phases of the alternating current supply line.

Rectifiers of the different types known in the art, and more particularly rectifiers of the gaseous or of the metallic vapor arcing type, are most frequently supplied from three phase alternating current supply lines with which they are connected by means of suitable transformers. To obtain satisfactory output voltage regulation in a rectifying system and to reduce the voltage ripple in the direct current output circuit thereof, the number of phases of the transformer secondary winding is usually increased from three to six by the connection of the middle points of the several winding portions thereof to form a common neutral point. The number of transformer secondary phases is also frequently increased to a number greater than six by the use of additional secondary windings or by suitable interconnection of portions of the same secondary winding which is then provided with taps to permit such interconnection. The transformer then becomes complicated in its construction and expensive to build, more particularly at high voltages because the interconnections between windings or between the taps thereof are difficult to insulate and must be given large clearances within the tank of the transformer. Such disadvantages are entirely obviated by supplying the rectifier by means of a plurality of separate transformers connected with a common supply line. Such method of connection also presents the advantage that the previously used large single transformer is replaced by a plurality of smaller units which are easier to build and may be more easily transported to and erected on the site of their utilization. It is also generally advantageous to provide for the simultaneous operation at every instant of several of the anodes of the rectifier, for which purpose the primary windings of the transformers may be connected with the supply line through a plurality of auto-transformers similar to the so-called interphase transformers known in the art.

It is, therefore, one of the objects of the present invention to provide an electric current rectifying system including an electric current rectifier supplied with current of a number of phases greater than the number of phases of the supply line.

Another object of the present invention is to provide a rectifying system including an electric current rectifier in which several of the anodes of the rectifier operate simultaneously at every instant.

Another object of the present invention is to provide a rectifying system including an electric current rectifier supplied from a plurality of separate transformers.

Another object of the present invention is to provide a rectifying system including an electric current rectifier supplied by transformers having their primary windings connected in parallel to the supply line.

Another object of the present invention is to provide a rectifying system including an electric current rectifier supplied by transformers connected with the supply line through auto-transformers.

Figure 2:
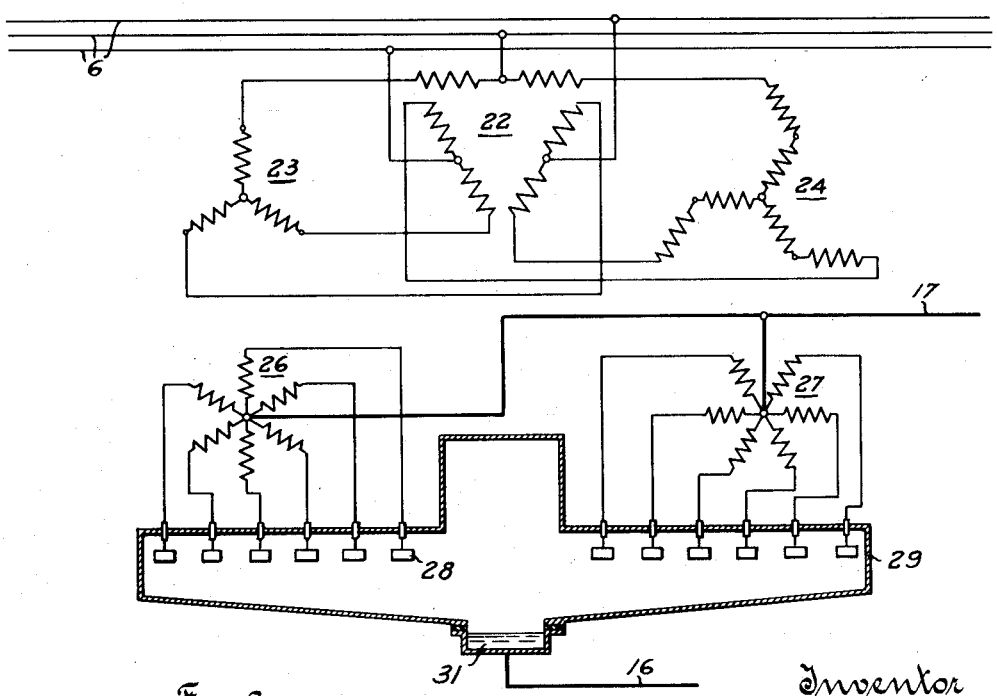

Objects and advantages other than those above described will be apparent from the following description when read in connection with the accompanying drawing, in which:

Fig. 1 diagrammatically illustrates one embodiment of the present invention in which a six-phase rectifier is supplied from a three-phase supply line through two three-phase transformers; and Fig. 2 diagrammatically illustrates another embodiment of the present invention in which a twelve-phase rectifier is supplied from a three-phase supply line through two six-phase transformers.

Referring more particularly to the drawing by characters of reference, reference numeral 6 designates a polyphase alternating current supply line herein represented as a three-phase line, such type of line being most frequently utilized in practice. The rectifying system includes two transformers having their primary windings 7 and 8 connected in parallel to the supply line and each comprising three winding portions connected in star. The transformers are provided with secondary windings 9 and 11, respectively, each connected in zigzag to avoid direct current magnetization in the cores thereof as is well known in the art. Windings 9 and 11 are so connected that the voltages appearing at their terminals constitute a six-phase system of voltages, and such windings are severally connected with anodes 12 of a six-phase rectifier 13. Rectifier 13 is shown as being of the metallic vapor type having a cathode 14 of vaporizable material such as mercury connected with the positive conductor 16 of the direct current output circuit. It will be understood that rectifier 13 may be replaced by a plurality of single phase rectifiers of any type such as the gaseous or metallic vapor type or by a rectifier of the high vacuum type. Rectifier 13 may also be replaced by a plurality of single phase rectifiers of the contact type such as the well known copper oxide rectifiers. The negative conductor 17 of the direct current output circuit is directly connected with the neutral points of windings 9 and 11. Windings 7 and 8 may be directly connected with line 6 but are preferably connected therewith through auto-transformers such as 18, 19 and 21.

In operation, assuming that line 6 is energized, windings 7 and 8 receive current therefrom and induce a system of six-phase alternating current voltages in windings 9 and 11 as is well known in the art. In the absence of auto-transformers 18, 19 and 21, windings 9 and 11 would supply, to each of the anodes of rectifier 13, currents extending over a period of one-sixth of a cycle of the voltage of line 6. Under such conditions windings 9 and 11 and windings 7 and 8 also would alternately carry current over periods of time equal to one-sixth of a cycle of the voltage in line 6. Due to the interposition of auto-transformers 18, 19 and 21, however, windings 7 and 8 are forced to carry equal amounts of currents at every instance with the result that windings 9 and 11 also carry equal currents at every instant. Because the voltages of windings 9 and 11 are displaced at 60 electrical degrees from each other, such simultaneous flow of current in windings 9 and 11 results in an extension of the flow of current through each of the portions thereof and through each anode of rectifier 13 over a period of one-third of a cycle instead of one-sixth of a cycle of the potential in the supply line 6. The utilization of the material of the transformers and of the rectifier is thereby greatly improved and the cost of the system is reduced accordingly.

In the embodiment illustrated in Fig. 2, the rectifying system includes two transformers having their primary windings 23 and 24 connected in star and in zigzag, respectively, and their secondary windings 26 and 27 both connected in star to form neutral points. Such method of connection results in forcing the voltages of the several portions of windings 26 and 27 to form a twelve-phase system of voltages. The several portions of windings 26 and 27 are connected with the anodes 28 of a twelve-phase rectifier 29 having a cathode 31 connected with conductor 16 of a direct current output line. Conductor 17 of the direct current output line is connected with the neutral points of windings 26 and 27. Windings 23 and 24 are shown as being connected with line 6 through a three-phase auto-transformer 22 similar in its characteristics to the three single phase auto-transformers 18, 19 and 21, illustrated in Fig. 1.

The operation of the present embodiment is similar to that described for the embodiment shown in Fig. 1 with the exception that the transformers deliver twelve-phase currents to the rectifier. In the present embodiment also the primary windings of the two transformers must simultaneously carry current at every instant because of the presence of the auto-transformer, and the secondary windings of the transformers which, in the present embodiment, receive voltages displaced by 30 electrical degrees with respect to each other, must also simultaneously carry current. The period of operation of each of the secondary winding portions is thereby increased from one-twelfth to one-sixth of a cycle of the voltage in line 6 thereby obtaining a better utilization of the material of the system.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric current rectifying system, a polyphase alternating current supply line, an electric current rectifier, transformers having the secondary windings thereof connected with said rectifier, and auto-transformers connecting the primary windings of the first said transformers with said supply line to eliminate the higher harmonics from the current supplied to said rectifier.

2. In an electric current rectifying system, a polyphase alternating current supply line, an electric current rectifier having a plurality of anodes, a plurality of polyphase transformers having the phases of the secondary windings thereof severally connected with the anodes of said rectifier, and a polyphase auto-transformer connecting the primary windings of the first said transformers in parallel with said supply line.

3. In an electric current rectifying system, a polyphase alternating current supply line, an electric current rectifier having a plurality of anodes and a cathode, a plurality of polyphase transformers having each of the secondary windings thereof connected to form neutral points and having the phases of the secondary windings thereof severally connected with the anodes of said rectifier, an auto-transformer connecting similarly arranged phases of the primary windings of the first said transformers and connecting such windings with said supply line, and a direct current output line having one conductor thereof connected with the cathode of said rectifier and the other conductor thereof connected with the neutral points of the secondary windings of the first said transformers.

4. In an electric current converting system, a polyphase alternating current line, an electric current converter comprising a plurality of anodes, a plurality of transformers each comprising a winding connected with said line and a winding divided into a plurality of equally displaced phase sections severally connected with said anodes, the sections of the second said winding of the respective said transformers being phase displaced relative to each other, and means included in the connections of the first said winding of each of said transformers with said line operable to cause flow of current in the respective sections of the second said winding of each of said transformers during a fraction of the voltage cycle of said line equal to one over the number of sections of the second said winding of each of said transformers.

JOHANNES KÜBLER.